E. PRIESTMAN & F. NELL.
PASSENGER REGISTER FOR VEHICLES.
APPLICATION FILED DEC. 8, 1913.

1,088,622.

Patented Feb. 24, 1914.

3 SHEETS—SHEET 1.

Witnesses:
Am orrell
S. Ford

Inventors.
Edmund Priestman
Fred Nell.
by their Attorney.

E. PRIESTMAN & F. NELL.
PASSENGER REGISTER FOR VEHICLES.
APPLICATION FILED DEC. 8, 1913.

1,088,622.

Patented Feb. 24, 1914.
3 SHEETS—SHEET 2.

WITNESSES.
A. M. Morrell
S. Ford

INVENTORS.
EDMUND PRIESTMAN
FRED NELL.
by their ATTORNEY

E. PRIESTMAN & F. NELL.
PASSENGER REGISTER FOR VEHICLES.
APPLICATION FILED DEC. 8, 1913.
1,088,622.
Patented Feb. 24, 1914.
3 SHEETS—SHEET 3.
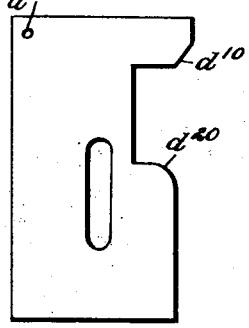
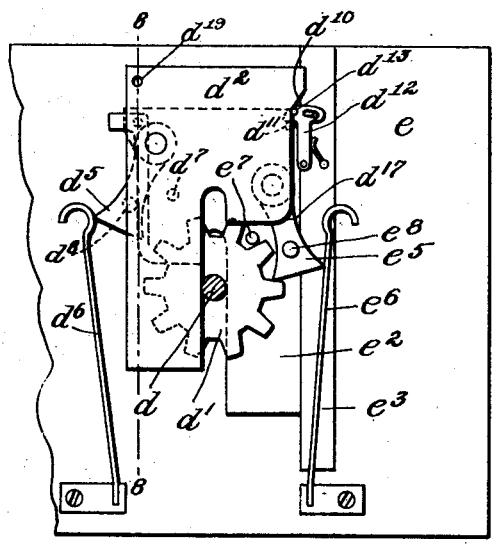
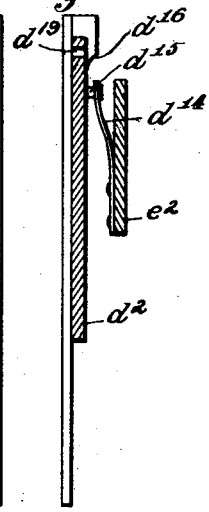
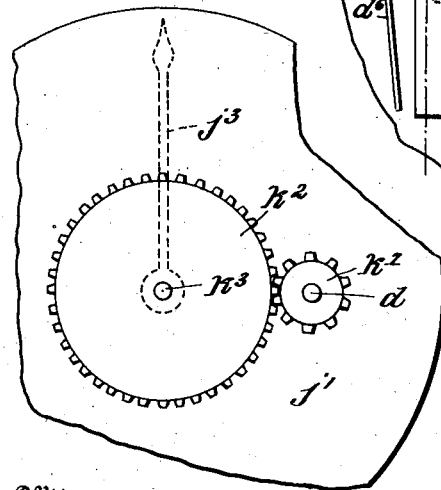
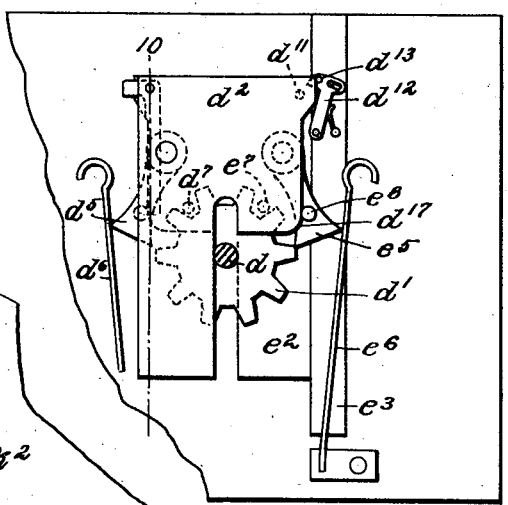
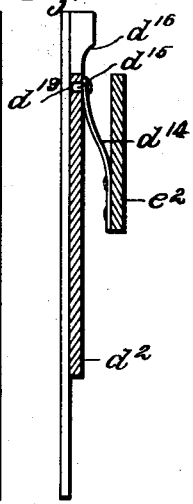
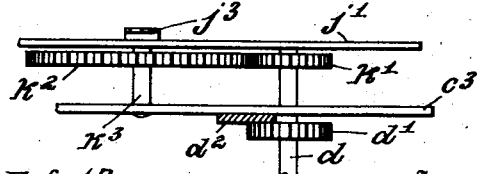
Inventors
Edmund Priestman
Fred Nell.
Witnesses
By
Attorneys
COLUMBIA PLANOGRAPH CO., WASHINGTON, D. C.

UNITED STATES PATENT OFFICE.

EDMUND PRIESTMAN AND FRED NELL, OF SHEFFIELD, ENGLAND.

PASSENGER-REGISTER FOR VEHICLES.

1,088,622.  Specification of Letters Patent.  Patented Feb. 24, 1914.

Application filed December 8, 1913. Serial No. 805,363.

*To all whom it may concern:*

Be it known that we, EDMUND PRIESTMAN and FRED NELL, subjects of the King of England, both residing in Sheffield, in the county of York, in England, have invented a certain new and useful Improvement in Passenger-Registers for Vehicles, of which the following is a specification.

This invention relates to a passenger register for vehicles involving the use of a counter for registering the entrance and exit of the passengers operated by interlocking steps and the object is to provide improved and simplified means working on this principle for automatically ascertaining with the use of a single counter the number of passengers on the upper deck of a tram car, omnibus or other vehicle.

The invention is fully disclosed in the following description and the essential novel features thereof specifically pointed out in the appended claims, reference being directed to the accompanying drawings which show as an example an embodiment of the invention and in which—

Figure 1:
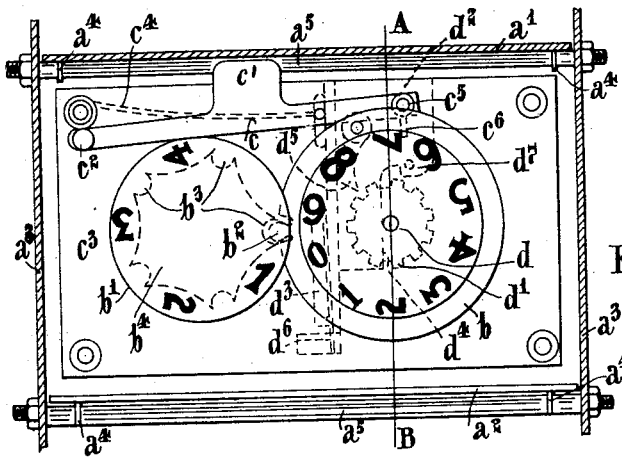
Figure 2:
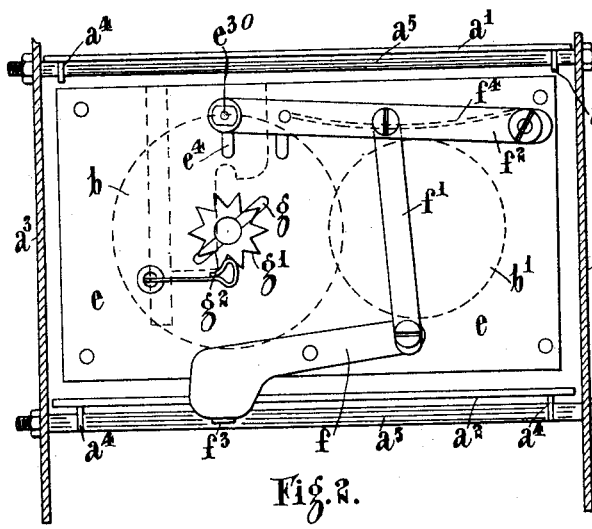
Figure 5:
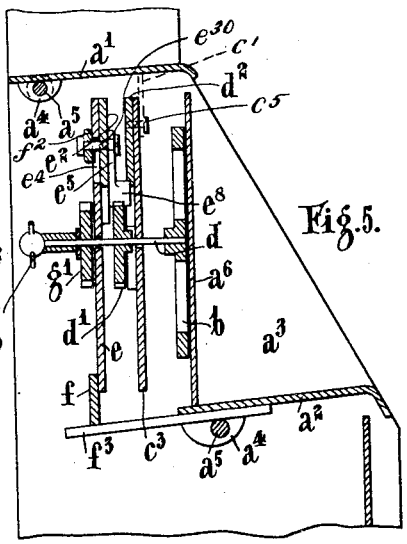
Figure 3:
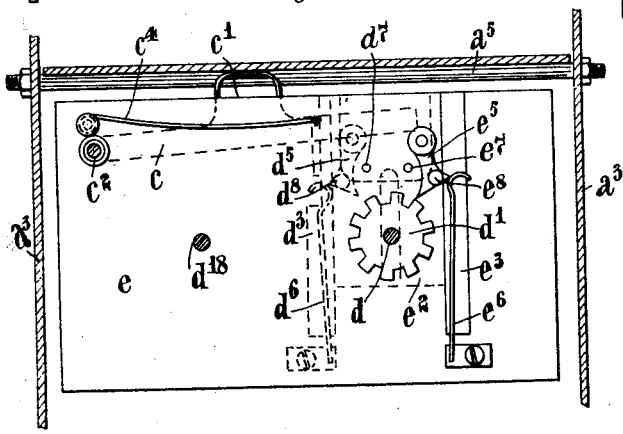
Figure 6:
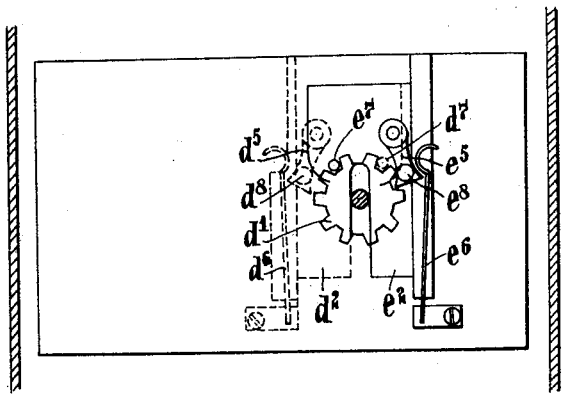
Figure 4:
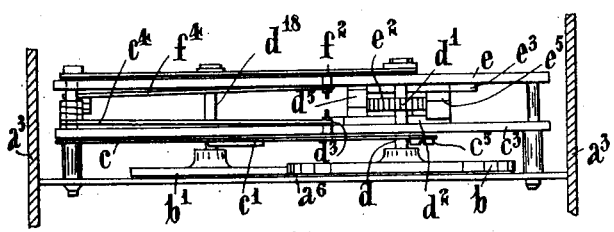
Figure 15:
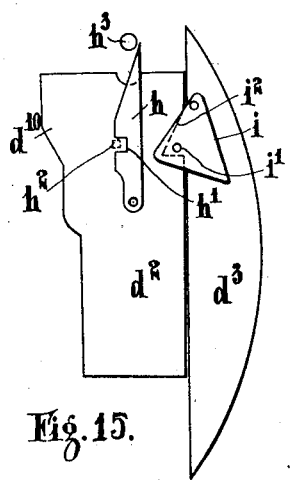
Figure 11:
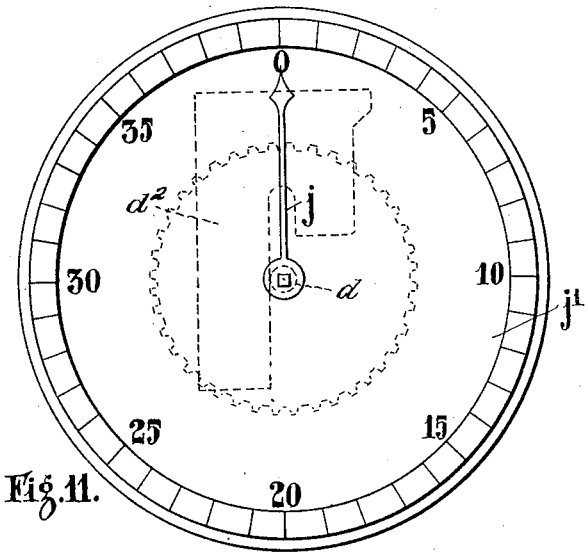

Figure 1 is a front elevation of the counting dials and certain parts of the operating mechanism with the step tread members and parts of the stairway framing in section. Fig. 2 an elevation from the rear of Fig. 1. Fig. 3 is a sectional elevation showing parts of the operating mechanism located between the front and rear mechanism shown in Figs. 1 and 2 respectively. Fig. 4 is a plan view of the parts shown in Figs. 1 to 3. Fig. 5 is a section on the line A—B of Fig. 1. Fig. 6 is a detail view of parts of Fig. 3 in a different position. Fig. 7 is a longitudinal sectional view taken through the device immediately back of the front plate $c^3$ showing the position of the slides just after the register has been advanced one point. Fig. 8 is a section on the line 8—8 of Fig. 7, showing the position of the slide interlocking means when one of the slides only is depressed. Fig. 9 is a view similar to Fig. 7 but showing the two slides depressed and holding both of the actuating pawls in inoperative position to prevent retrograde movement of the register as the plates rise to normal position. Fig. 10 is a section on the line 10—10 of Fig. 9, showing the slides interlocked to rise simultaneously. Fig. 11 is a front elevation of a modified form of dial, the dotted lines showing diagrammatically the operating means therefor. Fig. 12 is a rear elevation of a further modified form of dial and the operating means therefor. Fig. 13 is a top plan or edge view of the same. Fig. 14 is a side elevational view of a modified form of slide adapted to register the number of passengers descending the steps. Fig. 15 is a detail side elevational view of a modified form of the slide interlocking means, and means for locking the slides independently in depressed position.

Referring to Figs. 1 to 6, two adjacent tread members $a^1$ and $a^2$ are pivotally mounted in the side frames $a^3$ as by means of lugs $a^4$ traversed by spindles $a^5$ mounted in said side frames, or may be mounted by hinges if required. The riser $a^6$ between said tread members may be provided with apertures through which the indications on the dial hereinafter referred to may be readily seen.

The registering mechanism proper comprises two circular dials $b$ $b^1$ bearing upon them respectively the numerals or indications 0 to 9 and 1 to 4, the latter being usually sufficient for tram cars, omnibuses or like vehicles, although obviously the dials may be disposed to register or count up to any desired total according to the use to which the invention is put.

The dials are so disposed that at each revolution of the dial $b$ a tooth $b^2$, with which same is provided, engages a notch $b^3$ in a sprocket $b^4$ attached to the rear of the dial $b^1$, thus causing the latter dial to be moved through one fifth of a revolution.

The dials are shown as mounted behind the riser $a^6$ so that the indications thereon show through the apertures. The dial $b$ is caused to rotate through one tenth of a revolution should pressure be applied to either of the tread members $a^1$ or $a^2$ immediately above and below the riser respectively, this movement being effected as follows:—The treads $a^1$ and $a^2$ are normally supported at a short distance above the risers, thus allowing said treads to fall through this distance before coming in contact with the risers, the upper tread $a^1$ bearing upon an extension $c^1$ of a lever $c$ pivoted at $c^2$ to a plate $c^3$ behind the riser $a^6$ so that when the weight of the passenger falls upon the tread $a^1$ the lever is depressed. A spring $c^4$ raises the lever again to normal position when the tread is released of weight. The free end of the lever $c$ carries a pin $c^5$ which passes through a slot $c^6$ in the plate $c^3$.

Upon the axle or shaft $d$ on which the dial $b$ is mounted and at the rear of the plate $c^3$ is a wheel $d^1$ having ten teeth and between said toothed wheel and the rear face of said plate $c^3$ is a slide $d^2$ to which the aforesaid pin $c^5$ is secured, so that when the lever $c$ is depressed as described the pin $c^5$ is moved downward in the slot $c^6$ and carries the slide $d^2$ downward therewith. The said slide is guided in its movement at one side by a rib $d^3$ on the plate $c^3$ and is held in position by an edge $d^4$ of the slide contacting with the axle $d$ of the dial $b$.

The slide $d^2$ carries a pivoted pawl $d^5$ adapted when depressed to be acted on by a spring $d^6$ and when the slide is depressed the point of said pawl engages between two teeth of the wheel $d^1$ and rotates said wheel, thus causing the dial $b$ to move through one tenth of a revolution. The slide also carries a detent $d^7$ which when the slide has reached its lowermost position engages between two other teeth of the wheel $d^1$ and locks same against further rotation. The wheel $d^1$, slide $d^2$, pawl $d^5$, and spring $d^6$ are located between the plate $c^3$ and a second plate $e$, the front or outer surface of said plate $c^3$ being shown in Fig. 1. The rear surface of the second plate $e$ is shown in Fig. 2 and this plate carries on its forward surface a slide $e^2$ with pin $e^{30}$, pawl $e^5$, spring $e^6$, detent $e^7$ and guide $e^3$ identical with the parts carried by the plate $c^3$, but reversed with regard to the axis of the wheel $d^1$ as shown in broken lines in Fig. 3.

The pawls $d^5$ and $e^5$ each have a part $d^8$ and $e^8$ respectively made of greater thickness than the toothed wheel $d^1$ and the normal position of these parts is shown in Fig. 3. When however one of the slides is depressed and remains so, the pawl of the other slide is thrown outwardly by the curved lower edge of said slide so that the pawl cannot engage the toothed wheel $d^1$, this position of the parts being shown in Fig. 6.

The slide $e^2$ is actuated by means of lever $f$ link $f^1$ and lever $f^2$, the first of which is actuated by a tail piece $f^3$ attached to the lower tread $a^2$ when weight or pressure is exerted on said tread, the lever $f^2$ carrying at its free end the pin $e^{30}$ which extends through a slot $e^4$ in the plate $e$. The levers and slide are returned to normal position by a spring $f^4$. The springs herein shown and described may be of any other suitable form, and may be positioned otherwise than as shown if desired.

The operation of the mechanism described is as follows:—When weight is applied to the lower tread $a^2$ by a passenger stepping upon same, the slide $e^2$ is forced downward by means of the connected levers $f$ and $f^2$ and pin $e^{30}$. The pawl $e^5$ on said slide $e^2$ rotates the toothed wheel $d^1$ forward through one tenth of a revolution and consequently moves the dial $b$ through a corresponding angle. Upon completion of this movement the detent $e^7$ engaging between the teeth of said wheel $d^1$ prevents any further rotation or "lash" thereof which might be caused by the momentum of the dial. The passenger while ascending the steps still retains one foot on the lower tread $a^2$ and at the same time places his other foot on the upper tread $a^1$, thus depressing the latter. This action causes the slide $d^2$ to be forced downward and produces movements similar to those described in connection with the slide $d^2$, pawl $d^5$ and detent $d^7$ with the exception that the point of said pawl $d^5$ which rests upon the edge of the slide $e^2$ owing to the increased thickness of said pawl, is held out of engagement with the toothed wheel $d^1$ and consequently the pawl $d^5$ is rendered inoperative. Similarly, should a passenger be descending the steps, on depression of the upper tread $a^1$ the slide $d^2$ being forced downward causes the pawl $d^5$ to rotate the toothed wheel $d^1$ and consequently the dial $b$ in the reverse direction to that previously described and at the same time the outer edge of said slide is engaged by the pawl $e^5$, the latter being thus prevented from engaging the toothed wheel $d^1$ when the lower tread $a^2$ is depressed. Thus whichever tread $a^1$ or $a^2$ is first trodden upon causes the dial $b$ to be rotated either in a forward or backward direction by means of the mechanism described, that is to say, in a forward direction in the case of the lower tread being first depressed, and in a backward direction when the upper tread is first depressed, and further the depression of each tread automatically prevents the other tread from operating the dial so long as weight sufficient to depress same remains thereon. The axle $d$ of the dial $b$ and that $d^{18}$ of the dial $b^1$ are mounted in the plates $c^3$ and $e$, and the former axle may be extended beyond the rear of said plate $e$ and be provided with a handle or key $g$ by which the dials may be manually returned to zero or reset when desired. Also on said axle $d$ we may provide a star-wheel $g^1$ or equivalent with which engages a spring pawl $g^2$ which star-wheel and pawl act to aline the indications on the dials with the apertures (not shown). A single aperture may be provided for both the units and tens indications if required, this being chiefly dependent on the thickness of material of the riser behind which the dials are located.

To reduce momentum of the dials and avoid strain on the moving parts of the mechanism the said dials may be made of sheet xylonite, celluloid, vulcanite or other substances of light specific weight.

In the construction described above it is possible that on a passenger ascending or descending the steps and jumping from one step to another without retaining the first step in depressed position, the second step is free to operate the register, so that while actuation of the first step produces an addition on the register, actuation of the second step takes such addition off again leaving the register in its original position and consequently giving no permanent indication. To obviate this objection it is necessary that the step operating slides should be locked so that one slide is held depressed until released by the next step being trodden upon, and this may be attained by means shown in Figs. 7, 8, 9 and 10 in which the curved edge of each of the slides $d^2$, $e^2$ which actuate the counter, is provided with a downwardly and inwardly inclined portion $d^{10}$ and a pin $d^{11}$ about level with same at the opposite edge which engages a spring actuated catch $d^{12}$ attached to the guide $d^3$ holding the opposite side of the slide in position. The said catch has a pin $d^{13}$ extending therefrom so that when the inclined portion $d^{10}$ of the adjacent slide comes in contact with the pin on depression of the slide, it forces the catch $d^{12}$ outward clear of the locking pin $d^{11}$.

The above described locking operation involves registration by the second step depressed instead of the first, but it will be seen that if a passenger is ascending the steps he depresses the lower step and locks the slide, then depresses the second step and actuates the register. Assuming that two passengers are descending the steps, the first passenger treads on the upper step which the previous ascending passenger has left in locked condition, and then depresses the lower step and subtracts a unit from the registration, leaving the lower step locked and the upper step in action, so that upon the second descending passenger treading on the upper step he causes a unit to be added to the register instead of subtracted therefrom. This difficulty is overcome by means shown in Figs. 7, 8, 9 and 10 which comprises a flat spring $d^{14}$ attached to one of the slides, such as $e^2$, and having a pin $d^{15}$ which engages an aperture $d^{19}$ in the other slide $d^2$, thereby preventing the non-registering slide from springing up and locking the registering slide. When the passenger is clear of both steps, the slides being locked together rise simultaneously and the end of the locking spring comes into contact with a stationary inclined abutment $d^{16}$ which releases it from the locking pin.

In order to effect the registration by the second step instead of by the first, the curved edge of each slide is so shaped, for example as shown at $d^{17}$ Figs. 7 and 9, that the ratchet wheel is not disclosed for actuation by its pawl until the second step has been depressed. Thus the register is advanced by the mounting of passengers into the vehicle or the like. Should it be desired to reverse the operation of the register, and advance the same by the descending of passengers, as by entrance to a subway, or the like, the slides are given a slightly different form as shown in the modified view in Fig. 14. In this form the curved edge $d^{20}$ is positioned to face upwardly instead of downwardly so that the ratchet wheel $d^1$, see adjacent Fig. 7, is not disclosed for actuation by the pawl $e^5$ until the first step is depressed, and vice versa, the subtraction from the register takes place upon the ascending of the passengers.

In place of the flat spring $d^{14}$ for locking the slides together when both are depressed, as described with reference to Figs. 7, 8, 9 and 10, we may employ a construction as illustrated in Fig. 15, in which a catch $i$ is pivoted to the guide $d^3$ and has a pin $i^1$ extending outwardly on either side thereof, this pin falling into a notch $i^2$ when the slide $d^2$ is depressed. The inclined edge on the other slide corresponding to edge $d^{10}$ of the slide shown comes in contact with the pin $i^1$ when said other slide is depressed and forces said pin out of the notch, and at the same time a square pin $h^2$ (dotted lines) fixed upon the second slide engages a notch $h^1$ in a wedge shaped pawl $h$ pivoted to the first slide $d^2$, thus locking the two slides together. As the slides rise together from their depressed position as explained above the point of the pawl engages a pin $h^3$ fixed to the machine frame and as the slides rise further the pawl $h$ is gradually forced out of engagement with the pin $h^2$ until the two slides are disconnected.

It should be remarked that the steps themselves are raised by individual springs and levers before described and act only on the instrument to effect a registration or indication, that is to say, the slides only are locked in depressed position, the steps themselves rising directly the weight thereon is removed.

As an alternative to the two rotating numbered dials above described, we may provide an internal wheel $k$ (Fig. 11) to actuate the machine and having, say 40 teeth instead of 10 as in the preferred form, and to the end of the axle $d$ carrying this wheel is affixed a hand or pointer $j$, as illustrated in Fig. 11, which travels over a fixed dial $j^1$ numbered from 1 to 40. Thus, on the machine being put into action, this hand travels around the numbered dial, pointing to each number in turn.

The same result may be achieved, as shown in Figs. 12 and 13, by retaining the 10-toothed internal actuating wheel $d^1$ previously mentioned and on the end of the axle $d$ which carries the same, and on the outside of the machine's framework, having a second 10-toothed wheel $k^1$ geared into a 40-toothed wheel $k^2$ fixed on a separate axle $k^3$ and bearing the hand or pointer $f^3$.

The slides may be connected to the steps in any other suitable manner than by the levers herein shown and described, and may be located at a distance from or at one side of the steps, the principle and operation being the same.

We do not limit ourselves to the particular construction and arrangement of parts hereinbefore described and illustrated in the accompanying drawings, since the same may be varied within limits determined by the following claims without departing from the spirit of the invention.

What we claim as our invention and desire to secure by Letters Patent of the United States is:—

1. A passenger indicator for vehicles, comprising in combination two movably mounted steps, a single counting device in the form of a rotatable dial, and connections between said steps and counting device whereby initial movement of one step produces rotation of the dial in one direction and initial movement of the other step a rotation of the dial in the reverse direction.

2. A passenger indicator for vehicles, comprising in combination two movably mounted steps, a single counting device in the form of a rotatable dial, connections between said steps and counting device whereby initial depression of one step produces rotation of the dial in one direction, and initial depression of the other step a rotation of the dial in the reverse direction, and means whereby the retention of one of said steps in depressed position prevents the depression of the other step from operating the counting device.

3. A passenger indicator for vehicles, comprising in combination two movably mounted steps, a single counting device, a main actuating element between each step and the counting device, means operated by said actuating element whereby initial movement of one step produces an increased indication on said counting device, and initial movement of the other step a reduced indication thereon, and means for doubly locking said counting device when both steps are retained in indicating position simultaneously.

4. A passenger indicator for vehicles, comprising in combination two movably mounted steps, a single counting device, in the form of a rotatable dial, a slide operatively connected to each step, a toothed wheel connected to the counting device, and a pawl carried by each slide adapted to engage teeth on opposite sides of said wheel whereby depression of one step produces rotation of said toothed wheel in one direction and depression of the other step a corresponding degree of rotation in the reverse direction.

5. A passenger indicator for vehicles, comprising in combination two movably mounted steps, a single counting device, in the form of a rotatable dial, a slide operatively connected to each step, a toothed wheel connected to the counting device, and a pawl carried by each slide adapted to engage teeth on opposite sides of said wheel whereby depression of one step produces rotation of said toothed wheel in one direction and depression of the other step a corresponding degree of rotation in the reverse direction, and means whereby the actuation of one slide and retention thereof in such actuated position causes the pawl of the other slide to be rendered inoperative.

6. A passenger indicator for vehicles, comprising in combination two movably mounted steps, a single counting device, connections comprising slides between said steps and counting device whereby depression of one slide produces an increased indication on said counting device and depression of the other step a reduced indication thereon, and means for locking one slide in depressed condition until the other slide is depressed.

7. A passenger indicator for vehicles, comprising in combination two movably mounted steps, a single counting device, a slide operatively connected to each step, means operated by the slide whereby depression of one step produces an increased indication on the counting device and depression of the second step a reduced indication thereon, means for locking the slides of both steps together, and means for subsequently automatically releasing one slide from the other for the purpose specified.

8. A passenger indicator for vehicles comprising a single register, a pair of movably mounted steps, and a connection between each step and the register, one of said connections operating to advance the register upon the initial movement of the corresponding step and the other connection operating to retract the register upon the initial movement of the other step.

9. A passenger indicator for vehicles comprising two movably mounted steps, a single register, and a slide connected to each step and to the register, one of said slides operating to move the register in one direction upon the initial movement of the corresponding step and the other slide operating to move the register in the other direction upon the initial movement of the other step.

10. A passenger indicator comprising a single register, a pair of movably mounted steps, a connection between each step and the register, one of said connections operating to advance the register upon the initial movement of the corresponding step, and the other connection operating to retract the register upon the initial movement of the other step, and interlocking means between said connections adapted to hold the opposite connection inoperative upon the operation of either of the connections.

In witness whereof we have signed this specification in the presence of two witnesses.

EDMUND PRIESTMAN.
FRED NELL.

Witnesses:
LUTHER J. PARR,
RICE K. EVANS.

Copies of this patent may be obtained for five cents each, by addressing the "Commissioner of Patents, Washington, D. C."